June 11, 1935. G. A. ELLESTAD 2,004,806

MICROSCOPE ILLUMINATOR

Original Filed Feb. 2, 1933

Gerhard A. Ellestad
INVENTOR

Patented June 11, 1935

2,004,806

UNITED STATES PATENT OFFICE 2,004,806

MICROSCOPE ILLUMINATOR

Gerhard A. Ellestad, Rochester, N. Y., assignor to Bausch & Lomb Optical Company, Rochester, N. Y., a corporation of New York Application February 2, 1933, Serial No. 654,915
Renewed January 21, 1935

2 Claims. (Cl. 88—40)

This invention relates to microscopes and more particularly it has reference to a device for illuminating an object which is viewed or photographed through a microscope.

One of the objects of my invention is to provide an improved device for illuminating objects which are viewed through a microscope. Another object is to provide an illuminating device of the type described having improved means for supporting the light condenser in relation to the microscope objective. A further object is to provide a microscope illuminator having lens elements provided with apertures within which and on which the microscope objective is mounted. Other objects and advantages reside in certain novel features of construction, arrangement and combination of parts as will hereinafter be more fully described and pointed out in the appended claims.

Referring to the drawing.

Figure 1:
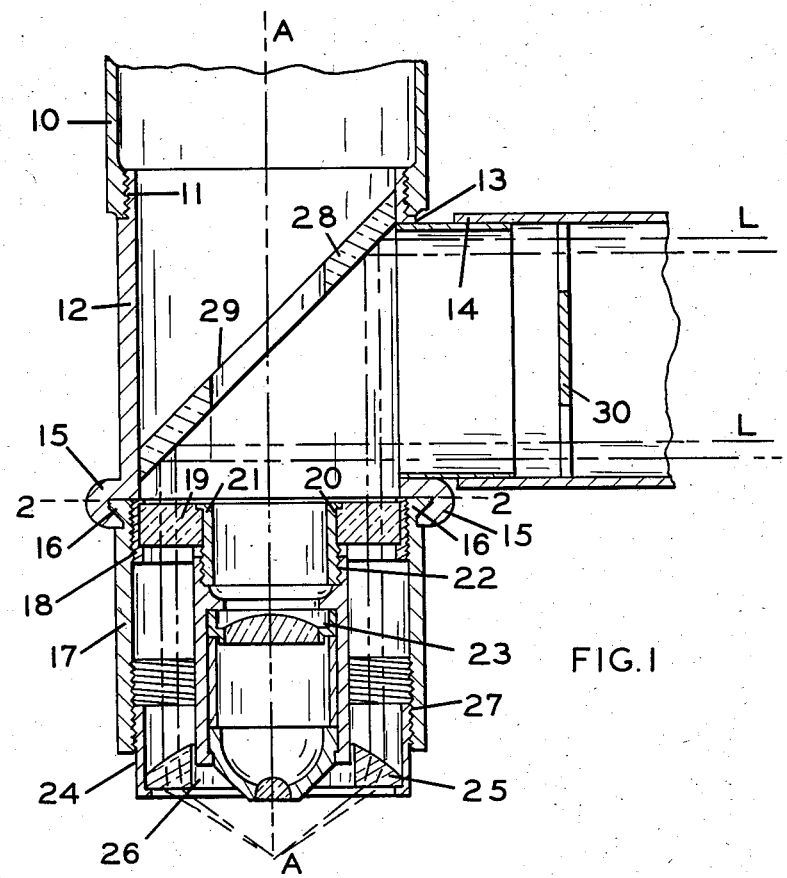
Fig. 1 is a vertical sectional view of an illuminating device embodying my invention.

A preferred embodiment of my invention is illustrated in the drawing wherein 10 indicates the lower portion of the body tube of a microscope. Detachably secured to the body tube 10 by means of the threaded portion 11 is the casing 12 having the side opening 13 in which is mounted the side tube 14, the purpose of which will hereinafter be explained. The lower end of casing 12 is provided with dove-tailed slides 15 which co-operate with slides 16 on the lower casing 17 and thereby afford means for detachably mounting the lower casing 17 on the casing 12. Mounted at the top of casing 17 by means of a threaded cell 18 is a transparent plate or member 19 which may be formed of glass, quartz or any other light transmitting material. The plate 19 is provided with a central aperture 20 in which is mounted the metal bushing 21 provided with threads 22 for detachably holding a microscope objective 23.

Mounted at the lower end of casing 17 is the member 24 which carries a condensing lens element 25 provided with a central aperture 26. The objective 23 is adapted to pass freely through the aperture 26 as the lens 25 is raised or lowered by turning the member 24 which is threaded at 27. Mounted in casing 12 is the inclined reflector 28 which is provided with an opening 29 in alignment with the optical axis of the microscope objective 23. Light rays, indicated at L, from a laterally disposed source, not shown, pass through tube 14 to the reflector 28 from whence they are directed downwardly through the transparent plate 19 and are then focused by condensing lens 25 onto an object below the objective. A centrally disposed opaque stop 30 is provided in tube 14 to prevent rays from passing to the opening 29 in reflector 28. None of the light rays from the source pass down through the objective but form a hollow bundle of rays which pass downwardly around the objective to the object. Light rays from the illuminated object pass upwardly through the objective and along the axis A—A to the ocular, not shown.

By providing the slidably mounted lower casing it is possible to readily detach the objective and condenser unit. Objectives of different focal lengths can be attached to the bushing 21 and the relation of the condenser lens 25 can be altered by turning the threaded member 25. The transparent plate 19 provides means for supporting the objectives and still permits light rays to pass freely down to the condenser lens without any obstruction.

Figure 3:
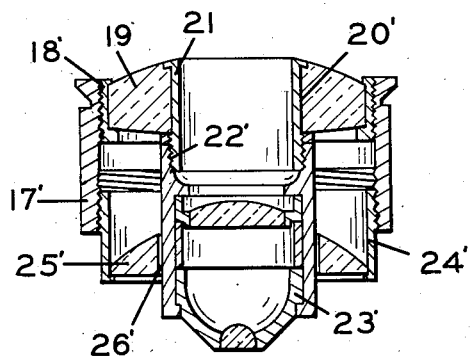
Fig. 3 is a sectional view of a modified form of illuminator.
Figure 2:
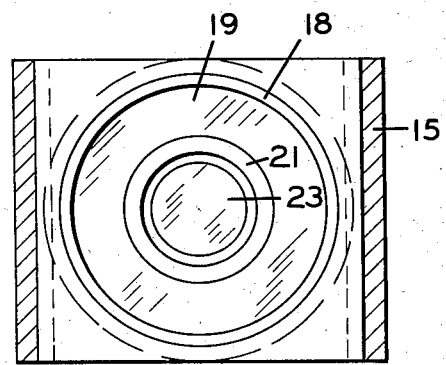
Fig. 2 is a sectional view taken on line 2—2 of Fig. 1.

In the modification shown in Fig. 3, I have shown the lower casing 17' detached from the upper casing. Instead of a flat plate, the lens element 19' is mounted in cell 18' at the top of casing 17'. The lens element 19' has the central aperture 20' in which is mounted the metal bushing 21' provided with threads 22' for detachably holding the microscope objective 23'. The member 24' is threaded to the lower end of casing 17' and carries the lens element 25' which cooperates with lens element 19' to direct light rays onto an object below the objective. The lens element 25' has the aperture 26' so that the element 25' may be moved co-axially with respect to the objective.

From the foregoing it will be apparent that I am able to attain the objects of my invention and provide an improved illuminating unit of the type described which will be efficient in operation and convenient in use. Various modifications can obviously be made without departing from the spirit of my invention.

I claim:

1. An illuminator for attachment to the body tube of a microscope, said illuminator comprising a casing having means for attaching it to the body tube, a reflector mounted in said casing, said reflector having a portion for transmitting light rays, a second casing detachably secured to said first casing, said second casing carrying a transparent member having a central aperture, a bushing mounted in said aperture, an objective secured to said bushing, and light condensing means mounted on said second casing, said condensing means having a central opening in alignment with said objective.

2. In an illuminator for microscopes the combination of a casing, a lens element mounted in said casing, said element having a central aperture provided with a bushing, an objective detachably secured to said bushing, a second lens element adjustably mounted in said casing, said second lens element having a central aperture through which said objective is adapted to extend, said second lens element cooperating with the other lens element to condense light rays onto an objective which is viewed through said objective.

GERHARD A. ELLESTAD.